(12) United States Patent
Sheehan et al.

(10) Patent No.: US 6,414,110 B1
(45) Date of Patent: Jul. 2, 2002

(54) PURIFICATION MEANS

(75) Inventors: Michael T. Sheehan; James R. Sounik; Keith M. Russ, all of Corpus Christi, TX (US)

(73) Assignee: Triquest LP, Dallas, TX (US)

( * ) Notice: Subject to any disclaimer, the term of this patent is extended or adjusted under 35 U.S.C. 154(b) by 0 days.

(21) Appl. No.: 09/667,856

(22) Filed: Sep. 20, 2000

Related U.S. Application Data

(63) Continuation-in-part of application No. 09/440,023, filed on Nov. 12, 1999.

(51) Int. Cl.[7] .................................................. C08F 6/00
(52) U.S. Cl. ....................................................... 528/495
(58) Field of Search .......................................... 528/495

(56) References Cited

U.S. PATENT DOCUMENTS 6,027,853 A * 2/2000 Malik et al. ............. 430/270.1

* cited by examiner

*Primary Examiner*—Terressa M. Boykin
(74) *Attorney, Agent, or Firm*—James J. Mullen

(57) ABSTRACT

The invention provides a novel process for improving the glass transition temperatures of polymers by partitioning the polymer between immiscible solvents to remove the low molecular weight polymer from the desired product.

9 Claims, No Drawings

PURIFICATION MEANS

RELATIONSHIP TO PRIOR APPLICATIONS

This application is a continuation-in-part of application Ser. No. 09/440,023 filed Nov. 12, 1999.

BACKGROUND OF THE INVENTION

Copolymers and terpolymers, when isolated from reaction solution are a mixture of compounds of varying composition and molecular weight. Typically they contain small quantities of starting material and by-products which are undesirable in the final polymer. The polymer mixture is precipitated from the solvent or solvent mixture by adding the mixture to a non-solvent, as for example water, hexane, heptane, octane, petroleum ether, or a mixture thereof The polymer is then dried in air or a nitrogen atmosphere. The subject of this invention pertains to a method of purifying the polymer.

Davidson, in U.S. Pat. No. 5,945,251, discloses a method of purifying polyhydroxystyrene polymers by adding an amine, a hydrophilic solvent, a hydrophobic solvent, and water to the polymer; separating the aqueous phase; then removing the hydrophilic solvent and the hydrophobic solvent to form the purified polymer.

Zempini, et al. in U.S. Pat. Nos. 5,789,522 and 5,939,511, extracts impurities from a phenolic resin by dissolving the resin in a photoresist solvent and extracting the water-soluble impurities therefrom.

SUMMARY OF THE DISCLOSURE

The present invention provides a novel process for improving the glass transition temperatures of polymers that are used in paints, resins, thickening agents, and in photoresist compositions. The process is an improvement over the prior art and is quite efficient. Specifically the invention provides a method of removing unreacted monomers, low weight average molecular weight polymers, and the like from impure polymers. Many analytical methods can be utilized to quantify the improvement in the purity of polymers. Average molecular weight, nuclear magnetic resonance, chromatography, and glass transition temperature are all effective in certain instances with certain molecules and characteristic side chains. All molecular weights are measured using a Water Gel Permeation Chromatograph calibrated using monodisperse polystyrene standards and are weight average molecular weights (mw).

According to the method of this invention, an alcoholic solution of the crude polymer is admixed with a non-solvent with which it is immiscible. The non-solvent layer is allowed to separate and the layers are isolated. This procedure is repeated as long as necessary to remove by-products and low weight average molecular weight materials which are more soluble in the non-solvent. The alcohol layer, containing the purified polymer is then admixed with water to precipitate the polymer. The purified polymer is isolated by filtration, centrifugation, or the like separation means and dried. Alternatively, the purified polymer may be solvent exchanged into a photoresist compatible solvent and the alcoholic solvent removed by distillation. That is, the alcoholic solution may alternatively be substituted by a second solvent useful for additional uses of the polymer. For example the polymer may be dissolved in a photoresist compatible solvent by adding such a photoresist compatible solvent and removing the alcohol by distillation, more succinctly described as a solvent swap into propylene glycol monomethyl ether acetate, ethyl lactate, or similar photoresist compatible solvent.

DETAILED DESCRIPTION OF THE INVENTION

This invention provides a process for the improvement in the composition of polymers I,

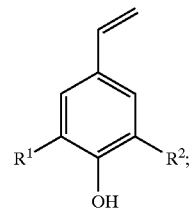

as a homopolymer and/or typically with one or more of the following monomers: an acrylate monomer having the formula II,

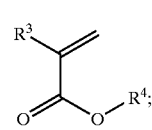

and/or with one or more ethylenically unsaturated copolymerizable monomers i.e.; styrene, 4-methylstyrene, tert.-butylstyrene, cyclohexyl acrylate, tert.-butyl acrylate, tert.-butyl methacrylate, maleic anhydride, dialkyl maleate, dialkyl fumarate and vinyl chloride, and the like, wherein alkyl is having 1 to 4 carbon atoms, typically manufactured by the steps of:

a) subjecting a monomer of formula III,

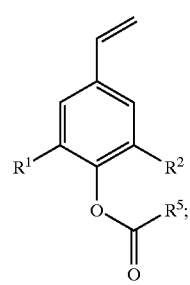

or a monomer of the formula III and/or monomer II, and/or one or more of said copolymerizable monomers to suitable polymerization conditions in an alcoholic solvent and in the presence of a free radical initiator at suitable temperature for a sufficient period of time to produce a polymer of corresponding composition;

b) subjecting said polymer from step a) to transesterification conditions in said alcoholic solvent in the presence of catalytic amounts of a base catalyst at suitable temperature such that the transesterified by-product ester formed is continuously removed from the reaction mixture to form the polymer of I, II, and said copolymerizable monomer, or subjecting the polymer from step a) to acidic hydrolysis with a strong acid;

c) passing said polymer solution in said alcoholic solvent from step b) through an ion-exchange bed to remove said base or acid catalyst;

wherein:
  i) $R^1$ and $R^2$ may be the same or different and independently selected from the group consisting of:
     hydrogen;
     fluorine, chlorine or bromine;
     alkyl or fluoroalkyl group having the formula $C_nH_xF_y$ where n is an integer from 1 to 4, x and y are integers from 0 to 2 n+1, and the sum of x and y is 2 n+1; and
     phenyl or tolyl;
  ii) $R^3$ may be selected from the group consisting of:
     hydrogen; and
     methyl, ethyl, n-propyl, iso-propyl, n-butyl, iso-butyl or tert.-butyl;
  iii) $R^4$ may be methyl, ethyl, n-propyl, iso-propyl or tert.-butyl; and
  iv) $R^5$ may be methyl or ethyl.

The alcoholic solvent is an alcohol having 1 to 4 carbon atoms and is selected from the group consisting of methanol, ethanol, propanol, isopropanol, t-butanol, and combinations thereof. The amount of solvent used is not critical and can be any amount which accomplishes the desired end result.

The free radical initiator may be any initiator that achieves the desired end result. The initiator may be selected from the group consisting of 2,2'-azobis(2,4-dimethylpentanenitrile), 2,2'-azobis(2-methylpropanenitrile), 2,2'-azobis(2-methylbutanenitrile), 1,1'-azobis(cyclohexanecarbonitrile), t-butyl peroxy-2-ethylhexanoate, t-butyl peroxypivalate, t-amyl peroxypivalate, diisononanoyl peroxide, decanoyl peroxide, succinic acid peroxide, di(n-propyl) peroxydicarbonate, di(sec-butyl)peroxydicarbonate, di(2-ethylhexyl) peroxydicarbonate, t-butylperoxyneodecanoate, 2,5-dimethyl-2,5-di(2-ethylhexanoylperoxy)hexane, t-amylperoxyneodecanoate, and combinations thereof The initiator is typically selected from the group consisting of 2,2'-azobis(2,4-dimethylpentanenitrile), 2,2'-azobis(2-methylpropanenitrile), 2,2'-azobis(2-methylbutanenitrile), 1,1'-azobis(cyclohexanecarbonitrile), t-butyl peroxy-2-ethylhexanoate, t-butyl peroxypivalate, t-amyl peroxypivalate, and combinations thereof.

The polymerization conditions are not critical and can be any temperature and pressure that will produce the desired end result. In general, the temperatures are from about 30° C. to about 100° C., preferably from about 40° C. to about 100° C., and most preferably from about 45° C. to about 90° C. The pressure may be atmospheric, sub-atmospheric or super-atmospheric. The polymerization time is not critical, but generally will take place over a period of at least one minute in order to produce a polymer of corresponding composition.

In step (b), in a transesterification, the crude polymer from step (a) is subjected to said transesterification conditions in an alcoholic solvent in the presence of catalytic amounts of a base catalyst. The base catalyst is such that it will not substantially react with said alkyl acrylate monomer II, or with said co-polymerizable monomers. The base catalyst is either an alkalic metal hydroxide or an alkalic metal alkoxide. The base catalyst is selected from the group consisting of lithium hydroxide, lithium methoxide, lithium ethoxide, lithium isopropoxide, sodium hydroxide, sodium methoxide, sodium ethoxide, sodium isopropoxide, potassium hydroxide, potassium methoxide, potassium ethoxide, potassium isopropoxide, cesium hydroxide, cesium methoxide, cesium ethoxide, cesium isopropoxide, and combinations thereof.

In step (b) if a hydrolysis is utilized to effect removal of the phenol blocking group, the acid should be a member of the strong acids, as for example hydrochloric acid, hydrobromic acid, sulfuric acid, or the like.

The purification method of this invention can be performed on the polymer in the blocked form, that is, with the phenolic groups protected as ester linkages or after transesterification as described in step (b) hereinabove. The purification method of this invention can also be performed before or after the ion exchange process of step (c). The purification method of this invention can also be performed on the isolated and dried polymer by dissolving the polymer in sufficient alcohol to effect complete dissolution.

According to the method of this invention, to the crude polymer, in an alcoholic solution, a non-solvent is added until a second layer is formed. The mixture is then stirred vigorously or is heated to boiling for several minutes and then allowed to stand until cool. A discrete second layer is formed which is then removed by decantation or similar means, and the process is repeated until no further purification is identified, as for example, until a small sample of the decanted non-solvent upon evaporation to dryness shows no residue.

The alcoholic solution of the polymer is then subjected to distillation to remove the remaining non-solvent, which was miscible in the alcohol. Most often removal of the non-solvent is accomplished by azeotropic distillation; the azeotropic mixture boiling below the boiling temperature of either the alcohol or the non-solvent.

Typical non-solvents useful for the method of this invention include hexane, heptane, octane, petroleum ether, ligroin, lower alkyl halohydrocarbons, i.e., methylene chloride, and the like.

Water, in an amount sufficient to aid the separation of the alcohol and the non-solvent may be added to aid in the separation of the alcohol and the non-solvent. Typically up to about 10 volume percent of water may be added without precipitation of the polymer from the alcoholic solution.

In some instances, addition of the non-solvent will cause precipitation of the polymer from the alcohol/non-solvent mixture. In this case, care must be taken to adjust the concentrations of the alcohol and the polymer to avoid such precipitation. Usually dilution of the mixture with additional alcohol will suffice to redissolve the polymer.

EXAMPLES

Example 1

The following example illustrates the use of the method of this invention on the purification of a terpolymer of 4-hydroxystyrene/styrene/tert.-butyl acrylate (80/10/10). 8467 g. 4-acetoxystyrene, 685 g. styrene, and 829 g. tert.-butyl acrylate is polymerized in 11870 g. methanol using 982 g. tert.-butyl peroxypivalate as a catalyst. A sample of the polymer is isolated for analytical purposes. The remainder is treated with 154 g. sodium methoxide and the resulting methyl acetate is removed by distillation. A second sample is removed for analysis. Heptane, 5030 g., is added and a second layer is noted. The mixture is heated at refluxing temperature for 2 hours and allowed to cool. The heptane separated and is removed by decantation. Heptane, 4.7 kg., is added and the mixture is again heated to refluxing temperatures for 3 hours and allowed to cool. The procedure is repeated a third time with 3.57 kg. heptane. After removal of the heptane layer the methanol solution is distilled to remove the remaining heptane and the solution is passed over a column of Amberlyst 15 to remove all traces of metal ions. The polymer is isolated by dissolution with water and dried under nitrogen. The $T_g$=159.4° C.

Comparative Example 1

The procedure of Example 1 is repeated except that no heptane extraction is used prior to precipitation of the resin. In that instance, the $T_g=150.7°$ C.

Example 2

The following example illustrates the use of the method of this invention on the purification of a terpolymer of 4-hydroxystyrene/styrene/tert.-butyl acrylate (75/15/10). 1680 g. 4-acetoxystyrene, 217 g. styrene, 175 g, tert.-butyl acrylate in 2464 g. methanol and 300 g. tetrahydrofuran are polymerized with 280 g. VAZO 52 (DuPont). A sample of the polymer is isolated for analytical purposes. The remainder is treated with 30.5 g. sodium methoxide and the resulting methyl acetate is removed by distillation. A second sample is removed for analysis. The $T_g=146.9°$ C. Heptane, 1.2 kg., is added and a second layer is noted. The mixture is heated at refluxing temperature for 2 hours and allowed to cool. A second layer does not form and ad additional 1.1 kg. heptane is added. The mixture is heated to refluxing temperature and then allowed to cool. A total of 1.4 kg of heptane is removed by decantation. Heptane, 1.4 kg., is added to the methanol solution and the mixture is heated to refluxing temperature for 2 hours and allowed to cool. Heptane, 1.7 kg., is removed by decantation and replaced by 1.7 kg fresh heptane. The mixture is heated to refluxing temperature for 2 hours and allowed to cool. The heptane layer is removed by decantation and the methanol solution is boiled to remove the remaining heptane. The polymer is isolated by dissolution with water and dried under nitrogen. The $T_g=152.30°$ C.

Example 3

The following example illustrates the use of the method of this invention on the purification of a terpolymer of 4-hydroxystyrene/styrene/tert.-butyl acrylate (55/25/20) and extraction of the purified terpolymer into ethyl lactate. 1443.4 g. 4-acetoxystyrene, 424.3 g. styrene, 411.0 g., tert.-butyl acrylate in 2279 g. methanol are polymerized with 244.0 g. tert.-butyl peroxypivalate. Transesterification is accomplished with 26.7 g. sodium methoxide in 774 g. methanol. The metal ions are exchanged through Amberlyst 15 resin to prepare a methanolic solution of the unpurified polymer. A sample is removed for analysis. The $T_g=132.6°$ C. The solution is extracted three times with heptane: (1) 3323 g. heptane added and the mixture stirred for 30 minutes then allowed to stand 30 minutes. The heptane layer (2553 g.) is removed and (2) replaced with 3345 g. of fresh heptane. The mixture is stirred for 30 minutes and allowed to stand for 30 minutes. The heptane layer (3755 g.) is removed and (3) replaced with 3316 g. fresh heptane. The mixture is stirred for 30 minutes and allowed to stand 30 minutes. The heptane layer (3678 g.) is removed and the methanol layer is distilled to remove the remaining heptane. A second sample is removed for analysis. The $T_g=139.5°$ C. Ethyl lactate, 1119.36 g., is added and the whole subjected to vacuum distillation at 370–380 torr. When the pot temperature reaches 48.7° C. (overhead temperature of 32° C.) an additional 743.72 g. of ethyl lactate is added, distillation is resumed until the pot temperature reaches 73.1° C. (overhead temperature of 43° C.) An additional 727.29 g. of ethyl lactate is added and the distillation is resumed until the pot temperature reaches 81.2° C. (overhead temperature of 49° C.).

Example 4

The following example illustrates the use of the method of this invention on the purification of a copolymer of 4-hydroxystyrene/tert.-butyl acrylate (75/25). 1048 g. 4-acetoxystyrene, 272 g, tert.-butyl acrylate in 1578 g. methanol are polymerized with 63.2 g. VAZO 52 (DuPont). A sample of the polymer is isolated for analytical purposes. The remainder is treated with 19.0 g. sodium methoxide and the resulting methyl acetate is removed by distillation. A second sample is removed for analysis. The $T_g=138.6°$ C. Heptane, 823 g., is added and a second layer is noted. The mixture is stirred at room temperature for 1 hr and then allowed to stand for 1 hr. A total of 475 g. of heptane is removed by decantation and replaced by 838 g. of fresh heptane. The mixture is again stirred at room temperature for 1 hr and then allowed to stand for 1 hr. A total of 929 g. of heptane is removed by decantation and replaced by 8343 g. of fresh heptane. A total of 1008 g. of heptane is removed by decantation. The methanol solution is boiled to remove the remaining heptane. The polymer is isolated by dissolution with water and dried under nitrogen. The $T_g=144.7°$ C.

Example 5

The following example illustrates the use of the method of this invention on the purification of commercially available poly(4-hydroxystyrene). The initial sample had a $T_g=165.3°$ C. A solution of 250 g. of poly(4-hydroxystyrene) in 583 g. of methanol is extracted three times with heptane, (1) 343 g. heptane added and the mixture stirred for 30 minutes then allowed to stand 30 minutes. The heptane layer (289 g.) is removed and (2) replaced with 352 g. of fresh heptane. The mixture is stirred for 30 minutes and allowed to stand for 30 minutes. The heptane layer (324 g.) is removed and (3) replaced with 348 g. fresh heptane. The mixture is stirred for 30 minutes and allowed to stand 30 minutes. The heptane layer (364 g.) is removed and the methanol layer is distilled to remove the remaining heptane. The polymer is isolated by dissolution with water and dried under nitrogen. The $T_g=172.6°$ C.

What is claimed is:

1. A method of purifying crude polymers containing hydroxystyrene which consists essentially of admixing an alcoholic solution of the polymer with a non-solvent with which it is immiscible, allowing the layers to separate and removing the non-solvent and dissolved by-products and polymers dissolved therewithin to manufacture a purified polymer.

2. The method of claim 1 wherein the alcoholic solvent is methanol.

3. The method of claim 1 wherein the non-solvent is a member of the class hexane, heptane, octane, petroleum ether, ligroin, lower alkyl halohydrocarbons, and the like.

4. The method of claim 3 wherein the non-solvent is heptane.

5. The method of claim 3 wherein the non-solvent is a lower alkyl halocarbon.

6. The method of claim 5 wherein the lower alkyl halohydrocarbon is methylene chloride.

7. The method of claim 1 wherein the purified polymer is isolated from the alcoholic solution by dissolution in water.

8. The method of claim 1 wherein the purified polymer is solvent exchanged into ethyl lactate and the alcoholic solvent is removed by distillation.

9. The method of claim 1 wherein the purified polymer is solvent exchanged into propylene glycol monomethyl ether acetate and the alcoholic solvent is removed by distillation.

* * * * *